(12) United States Patent
Ataka et al.

(10) Patent No.: US 7,846,991 B2
(45) Date of Patent: Dec. 7, 2010

(54) BIODEGRADABLE RESIN COMPOSITION AND METHOD FOR PRODUCING THE SAME

(75) Inventors: Eiji Ataka, Kumamoti (JP); Makoto Uemura, Kumamoti (JP)

(73) Assignee: Gaia Basis Co., Ltd., Kumamoto (JP)

( * ) Notice: Subject to any disclaimer, the term of this patent is extended or adjusted under 35 U.S.C. 154(b) by 0 days.

(21) Appl. No.: 12/596,576

(22) PCT Filed: Apr. 18, 2008

(86) PCT No.: PCT/JP2008/057589
§ 371 (c)(1),
(2), (4) Date: Dec. 1, 2009

(87) PCT Pub. No.: WO2008/133200
PCT Pub. Date: Jun. 11, 2008

(65) Prior Publication Data
US 2010/0093890 A1    Apr. 15, 2010

(30) Foreign Application Priority Data
Apr. 19, 2007    (JP) .............................. 2007-136012

(51) Int. Cl.
*C08L 67/00* (2006.01)
*C08L 3/02* (2006.01)
*C08L 97/02* (2006.01)
*C08L 101/16* (2006.01)
*C08K 5/00* (2006.01)
*C08K 11/00* (2006.01)

(52) U.S. Cl. ........................................ 523/128; 524/47

(58) Field of Classification Search ................ 523/128; 524/47
See application file for complete search history.

(56) References Cited

U.S. PATENT DOCUMENTS

| 6,348,524 B2 | 2/2002 | Bastioli et al. |
| 7,265,160 B2 * | 9/2007 | Oka et al. .................. 521/50.5 |
| 2008/0044650 A1 | 2/2008 | Sukigara et al. |

FOREIGN PATENT DOCUMENTS

| JP | 2001-302835 | 10/2001 |
| JP | 2002-518538 | 6/2002 |
| JP | 2005-280797 | 10/2005 |
| WO | WO 2006/075553 | 7/2006 |

* cited by examiner

*Primary Examiner*—Kriellion A Sanders
(74) *Attorney, Agent, or Firm*—Hamre, Schumann, Mueller & Larson, P.C.

(57) ABSTRACT

The present invention relates to a biodegradable resin composition containing a resin component comprising polylactic acid and polybutylene terephthalate, and a powdered vegetable fiber component comprising corn starch, and relates to a method for producing the same. The present biodegradable resin composition contains the resin component (A) comprising 20 to 50 parts by weight of polylactic acid and 10 to 40 parts by weight of polybutylene terephthalate, and the powdered vegetable fiber component (B) comprising 10 to 70 parts by weight of corn starch, the total of the resin component (A) and the powdered vegetable fiber component (B) amounting to 100 parts by weight. The present biodegradable resin composition can be suitably used for producing a molded article.

9 Claims, No Drawings

BIODEGRADABLE RESIN COMPOSITION AND METHOD FOR PRODUCING THE SAME

TECHNICAL FIELD

The present invention relates to a biodegradable resin composition containing a resin component comprising polylactic acid and polybutylene terephthalate, and a powdered vegetable fiber component comprising corn starch, and to a method for producing the same.

BACKGROUND ART

For example, Patent Document 1 discloses a biodegradable resin foam obtained by heat-melting a biodegradable resin composition under an applied pressure, reducing the pressure, and performing foam molding of the biodegradable resin composition, wherein the biodegradable resin composition is obtained by adding a starch-based substance and vegetable granules to 100 parts by weight of an aliphatic polyester, wherein the total amount of the starch-based substance (a) and the vegetable granules is from 50 to 400 parts by weight, and also the amount of the vegetable granules (b) is from 20 to 80% by weight, the total of the starch-based substance and the plant granules amounting to 100 parts by weight, and wherein the biodegradable resin composition optionally contains 50 parts by weight or less of water as a blowing agent and also 30 parts by weight or less of an inorganic substance powder as a foam nucleating agent.

Furthermore, Patent Document 1 discloses that polylactic acid can be used as the aliphatic polyester, corn starch can be used as the starch-based substance, and a rice hull powder can be used as the vegetable granules (refer to Patent Document 1, paragraph numbers 0010, 0013 and 0014 etc), and also discloses that the biodegradable resin foam is useful for food containers, and cushioning materials for packing.

However, in the biodegradable resin composition disclosed in Patent Document 1, since polylactic acid used as the aliphatic polyester has high rigidity and low viscosity, a molded article obtained by molding the composition, in other words, the biodegradable resin foam exhibits decreased break strength. Therefore, Patent Document 1 cannot provide a biodegradable resin composition whose molded article has some degree of rigidity even if the obtained molded article has comparatively small wall thickness, and also which has sufficient extensibility upon molding (injection molding, blow molding, etc.).

Patent Document 2 discloses a biodegradable film comprising a polyester (component A) made from aliphatic diols having at least 2 to 5 carbon atoms and an aliphatic dicarboxylic acid having 3 to 6 carbon atoms, and a biodegradable modified polyethylene terephthalate (component B), wherein the content of the component A is more than 50% by weight and 95% by weight or less based on the total amount of the component A and the component B, and also discloses a bag made of the film.

Furthermore, Patent Document 2 discloses that the component A is at least one kind of a polyester selected from the group consisting of polybutylene succinate, polybutylene succinate terephthalate, polybutylene succinate adipate, polybutylene succinate carbonate, polybutylene terephthalate adipate, polybutylene succinate adipatete terephthalate, polybutylene succinate, and modified polyesters thereof (refer to Patent Document 2, claim 3).

However, the polybutylene terephthalate-based resin according to Patent Document 2 is suited for molding of a film, such as a bag, and is excellent in tensile strength and tensile elongation at break. However, the polybutylene terephthalate-based resin has not high rigidity, like polylactic acid, and therefore cannot retain the shape of the obtained molded article, and thus it has no self-standing properties.

Patent Document 1: JP 2001-302835 A
Patent Document 2: JP 2005-280797 A

DISCLOSURE OF THE INVENTION

Problems to be Solved by the Invention

An object of the present invention is to provide a biodegradable resin composition (in other words, a biodegradable resin composition for molding a molded article) which has sufficient extensibility upon molding (for example, injection molding, blow molding, vacuum molding and sheet molding, etc.) and exhibits satisfactory fluidity upon molding, and also give a molded article having a low shrinkage factor and is excellent in moldability of an accurate molded article, and further gives some degree of rigidity to the molded article even if the obtained molded article has comparatively small wall thickness, and to provide a method for producing the same.

Means for Solving the Problems

The present invention provides, in one aspect, a biodegradable resin composition containing:

(A) a resin component comprising polylactic acid and polybutylene terephthalate (hereinafter also referred to as a "resin component (A)", and (B) a powdered vegetable fiber component comprising corn starch (hereinafter also referred to as a "powdered vegetable fiber component (B)", wherein the resin component (A) comprises 20 to 50 parts by weight of polylactic acid and 10 to 40 parts by weight of polybutylene terephthalate, and the powdered vegetable fiber component (B) comprises 10 to 70 parts by weight of corn starch, the total of the resin component (A) and the powdered vegetable fiber component (B) amounting to 100 parts by weight.

The biodegradable resin composition according to the present invention can be suitably used as a biodegradable resin composition for producing a molded article (or a molding).

In the biodegradable resin composition according to the present invention, it is preferred that the powdered vegetable fiber component (B) further comprises 10 to 30 parts by weight of a vegetable residue, and also the total amount of the corn starch and the vegetable residue is from 10 to 70 parts by weight.

The present invention provides, in another aspect, a method for producing a biodegradable resin composition mentioned above, which comprises:

(i) a step of crushing a resin component (A) comprising 20 to 50 parts by weight of polylactic acid and 10 to 40 parts by weight of polybutylene terephthalate (hereinafter also referred to as a "crushing step"), and (ii) a step of kneading a powdered vegetable fiber component (B) comprising 10 to 70 parts by weight of corn starch with the resin component obtained in the crushing step (hereinafter also referred to as a "kneading step"), the total of the resin component (A) and the powdered vegetable fiber component (B) amounting to 100 parts by weight.

The present invention provides, in one embodiment, a method for producing a biodegradable resin composition, wherein the resin component (A) is crushed into particles having a particle diameter (or a particle size) of 500 or less in the crushing step (i).

Furthermore, the present invention provides, in a preferred embodiment, a method for producing a biodegradable resin composition, further comprising (iii) a step of producing a molding material from the kneaded component obtained in the kneading step (ii) (hereinafter also referred to as a "molding material producing step").

Furthermore, the present invention provides, in a preferred aspect, a molded article produced from the biodegradable resin composition.

Effects of the Invention

The biodegradable resin composition according to the present invention is a biodegradable resin composition containing a resin component (A) and a powdered vegetable fiber component (B), wherein
the resin component (A) comprises 20 to 50 parts by weight of polylactic acid and 10 to 40 parts by weight of polybutylene terephthalate, and
the powdered vegetable fiber component (B) comprises 10 to 70 parts by weight of corn starch,
the total of the resin component (A) and the powdered vegetable fiber component (B) amounting to 100 parts by weight. Therefore, the biodegradable resin composition according to the present invention can be suitably used as a biodegradable resin composition (in other words, a biodegradable resin composition for molding a molded article) which has sufficient extensibility upon molding (for example, injection molding, blow molding, vacuum molding and sheet molding, etc.) and exhibits satisfactory fluidity upon molding, and also give a molded article having a low shrinkage factor and is excellent in moldability of an accurate molded article, and further gives some degree of rigidity to the molded article even if the obtained molded article has comparatively small wall thickness.

In the biodegradable resin composition according to the present invention, when the powdered vegetable fiber component (B) further comprises 10 to 30 parts by weight of a vegetable residue, and also the total amount of corn starch and the vegetable residue is from 10 to 70 parts by weight, heat resistance can be improved and antistatic properties can be improved.

The method for producing a biodegradable resin composition according to the present invention comprises:

(i) a step of crushing a resin component (A) comprising 20 to 50 parts by weight of polylactic acid and 10 to 40 parts by weight of polybutylene terephthalate, and (ii) a step of kneading a powdered vegetable fiber component (B) comprising 10 to 70 parts by weight of corn starch with the resin component obtained in the crushing step, the total of the resin component (A) and the powdered vegetable fiber component (B) amounting to 100 parts by weight. Therefore, the crushing step enables kneading of the resin component and the powdered vegetable fiber component, which could have never been performed by a conventional method.

The method according to the present invention can perform kneading of the resin component (A) and the powdered vegetable fiber component (B) more effectively when the resin component (A) is crushed into particles having a particle diameter of 500 μm or less in the crushing step (i), and uniformity of the resin composition is more improved. Furthermore, it becomes possible to perform kneading with lower energy in the kneading step.

When the method according to the present invention further comprises (iii) a step of producing a molding material from the kneaded component obtained from kneading step (ii), a molding material suited for the objective molded article can be produced.

EMBODIMENTS FOR CARRYING OUT THE INVENTION

The biodegradable resin composition according to the present invention contains a specific resin component (A) and a powdered vegetable fiber component (B) comprising a specific corn starch,
the resin component (A) comprises 20 to 50 parts by weight of polylactic acid and 10 to 40 parts by weight of polybutylene terephthalate, and
the powdered vegetable fiber component (B) comprises 10 to 70 parts by weight of corn starch,
the total of the resin component (A) and the powdered vegetable fiber component (B) amounting to 100 parts by weight.

The "resin component (A)" according to the present invention may contain other biodegradable resins as long as it comprises 20 to 50 parts by weight of polylactic acid and 10 to 40 parts by weight of polybutylene terephthalate, based on 100 parts by weight of the total of the resin component (A) and the powdered vegetable fiber component (B) and the objective biodegradable resin composition of the present invention can be obtained.

When the content of polylactic acid in the resin component is less than 20 parts by weight, since the obtained molded article is inferior in rigidity, properties of the molded article become close to those of a flexible substance. When the content is more than 50 parts by weight, since the obtained molded article is superior in rigidity, breakage strength of the molded article decreases.

When the content of the polybutylene terephthalate is less than 10 parts by weight, since the biodegradable resin composition is inferior in extensibility, moldability deteriorates. When the content is more than 40 parts by weight, since the biodegradable resin composition is superior in extensibility, properties of the molded article become close to those of a flexible substance.

The content of polylactic acid is preferably from 20 to 48 parts by weight, more preferably from 25 to 45% by weight, and particularly preferably from 30 to 40% by weight.

The content of polybutylene terephthalate is preferably from 10 to 38% by weight, more preferably from 12 to 35% by weight, and particularly preferably from 15 to 25% by weight.

"Polylactic acid" according to the present invention is usually called polylactic acid and is not particularly limited as long as it has biodegradability and the objective biodegradable resin composition of the present invention can be obtained. Polylactic acid produced from materials derived from plants, for example, corn etc. can be exemplified. The polylactic acid can be produced by a conventional method and commercially available polylactic acids can be used. For example, PLA (trade name) of NatureWorks and LACEA (trade name) of Mitsui Chemicals, Inc. can be exemplified.

"Polybutylene terephthalate" according to the present invention is usually called polybutylene terephthalate and is not particularly limited as long as it has biodegradability and the objective biodegradable resin composition of the present invention can be obtained. Polybutylene terephthalate can be produced by a conventional method and commercially available polybutylene terephthalates can be used. For example, Ecoflex (trade name), which is commercially available from BASF Japan Ltd., can be exemplified.

Examples of other biodegradable resins which may be contained in the resin component (A) include polyethylene terephthalates (for example, Biomax (trade name) of DuPont, and BIONOLLE (trade name) of SHOWA HIGHPOLYMER CO., LTD.). When the resin component (A) contains other biodegradable resins, a portion of polylactic acid may be replaced by other biodegradable resins.

The powdered vegetable fiber component (B) according to the present invention comprises 10 to 70 parts by weight of corn starch, the total of the resin component (A) and the powdered vegetable fiber component (B) amounting to 100 parts by weight, and may contain other powdered vegetable fibers as long as the objective biodegradable resin composition of the present invention can be obtained.

When the content of the corn starch is less than 10 parts by weight, cost cannot be reduced. When the content of the corn starch is more than 70 parts by weight, moldability of the biodegradable resin composition deteriorates and the molded article is broken when the molded article is removed from a mold.

The "corn starch" according to the present invention is usually called corn starch and is not particularly limited as long as the objective biodegradable resin composition of the present invention can be obtained. Commercially available corn starches can be used.

The content of the corn starch is preferably from 15 to 65 parts by weight, more preferably from 20 to 65 parts by weight, and particularly preferably from 30 to 60 parts by weight.

Examples of other powdered vegetable fiber include vegetable residue and biomass, such as rice hull, lees of shochu, and lees of rice, tapioca, used tea leaves, kenaff and sugar cane.

The powdered vegetable fiber component (B) according to the present invention may contain these other powdered vegetable fibers in an amount of 10 to 30 parts by weight, and 10 to 20 parts by weight.

Usually, the biodegradable resin composition according to the present invention may appropriately contain additives to be used, for example, crystal nucleating agents such as talc, and pigments etc.

The method for producing a biodegradable resin composition according to the present invention comprises:

(i) a step of crushing a resin component (A) comprising 20 to 50 parts by weight of polylactic acid and 10 to 40 parts by weight of polybutylene terephthalate, and (ii) a step of kneading a powdered vegetable fiber component (B) comprising 10 to 70 parts by weight of corn starch with the resin component obtained in the crushing step, the total of the resin component (A) and the powdered vegetable fiber component (B) amounting to 100 parts by weight.

In the method according to the present invention, a resin component (A) comprising polylactic acid and polybutylene terephthalate in the form of pellets is crushed in the crushing step and mixed with a powdered vegetable fiber component (B) comprising corn starch, followed by kneading.

It is preferred that the resin component (A) is crushed in the crushing step (i) so that the obtained particles have a particle diameter of 500 μm or less. In the present invention, a particle diameter refers to an average of length of a major axis (or long axis) of particles.

The present inventors have found that, if the resin component (A) has a particle diameter of 500 μm or less, the powdered vegetable fiber component (B) and the resin component (A) can be kneaded more uniformly in the kneading step and uniformity of the resin composition is more improved. They have also found that it becomes possible to perform kneading with lower energy in the kneading step and also humidity resistance of a molded article obtained by molding a biodegradable resin composition can be improved.

The crushing method of the resin component (A) is not particularly limited as long as crushing can be performed, and it is preferred to use a wet-crushing method or a frozen crushing method. It is more preferred to use a wet-crushing method.

In case where the resin component (A) has a particle diameter of more than 500 μm, when several kinds of resin components each having a different particle diameter and a different melting temperature are kneaded with a powdered vegetable fiber component, fluctuation sometimes occur in uniform mixing. Therefore, stability of molding sometimes deteriorates.

The present invention provides, in another embodiment, the above method for producing a biodegradable resin composition, wherein the powdered vegetable fiber component (B) further comprises 10 to 30 parts by weight of a vegetable residue and also the total amount of corn starch and the vegetable residue is from 10 to 70 parts by weight.

In this embodiment, according to the present invention, it is possible to obtain a molded article in which heat resistance can be improved and also antistatic properties can be improved.

The method for producing a biodegradable resin composition according to the present invention can further comprises:

(iii) a step of producing a molding material from the kneaded component obtained in the kneading step (ii).

A molding material suited for the objective molded article can be produced by this molding material producing step (iii).

This molding material may be in various forms, for example, pellets, powders, granules and particle. In general, the molding material is preferably in the form of pellets. The molding material is then molded into various biodegradable resin molded articles using known suitable molding methods, for example, injection molding, blow molding, vacuum molding and sheet molding methods.

The wall thickness of the molded article to be obtained by molding is not particularly limited and is preferably a so-called thin wall thickness. For example, the wall thickness is preferably from 0.5 to 3 mm, more preferably from 0.5 to 1 mm, and particularly preferably from 0.5 to 0.8 mm.

Examples of the thin molded article (or product) to be obtained by molding include thin tablewares such as tray and coaster; cases of DVD and floppy disk; thin stationery products such as blotting pad and open file; bottle products of juice and various seasonings; casings of cellular phones; components of household electrical appliances; components of office appliances; and automobile components.

EXAMPLES

Examples and Comparative Examples further illustrate a biodegradable composition and a method for producing the same according to the present invention in detail, and it should be understood that these are exemplary of the invention and are not to be considered as limiting.

Using polylactic acid (PLA (trade name) manufactured by NatureWorks, LACEA (trade name) manufactured by Mitsui Chemicals, Inc.) and polybutylene terephthalate (Ecoflex (trade name) manufactured by BASF Japan Ltd.), a resin component was produced.

According to the formulation of polylactic acid and polybutylene terephthalate described in Table 1, the resin components were blended and then crushed so as to adjust to the particle diameter described in Table 1. The mixture was crushed at room temperature using a stone-mill type crusher. After dehydration and drying, a crushed resin component was obtained.

Polylactic acid used in examples had a glass transition point of about 55 to 60° C., and polybutylene terephthalate had a glass transition point of −30° C. The crushing method of polylactic acid and polybutylene terephthalate is not particularly limited as long as crushing can be performed, and is preferably a wet finely crushing or frozen crushing method. More preferably, polylactic acid and polybutylene terephthalate are subjected to wet crushing.

Then, powdered corn starch (corn starch (trade name) manufactured by NIHON STARCH CO., LTD.), a powdered vegetable fiber component comprising a rice hull powder (finely-crushed rice hull (trade name) having a size of 100 μm, manufactured by NAKANIHON SANSHO KK) as a vegetable residue and the crushed resin component were mixed at a ratio shown in Table 1 while stirring.

The resin component and the powdered vegetable fiber component were kneaded and then extrusion-molded into pellets using a twin screw extrusion molding machine, thus obtaining a molding material. The molding material was molded into a food container using an injection molding machine and moldability was evaluated. The results are shown in Table 2.

TABLE 1

| Sample No. | Polylactic acid (parts by weight) | Polybutylene terephthalate (parts by weight) | Particle diameter | Corn starch (parts by weight) | Rice hull powder (parts by weight) |
|---|---|---|---|---|---|
| 1 | 15 | 25 | 500 μm or less | 60 | 0 |
| 2 | 22 | 18 | 500 μm or less | 60 | 0 |
| 3 | 28 | 12 | 500 μm or less | 60 | 0 |
| 4 | 55 | 0 | 500 μm or less | 45 | 0 |
| 5 | 70 | 0 | 500 μm or less | 30 | 0 |
| 6 | 35 | 5 | 500 μm or less | 60 | 0 |
| 7 | 25 | 15 | 500 μm or less | 60 | 0 |
| 8 | 35 | 25 | 500 μm or less | 40 | 0 |
| 9 | 35 | 35 | 500 μm or less | 30 | 0 |
| 9a | 35 | 35 | 3 to 6 mm | 30 | 0 |
| 10 | 45 | 30 | 500 μm or less | 25 | 0 |
| 10a | 45 | 30 | 3 to 6 mm | 25 | 0 |
| 11 | 40 | 25 | 500 μm or less | 35 | 0 |
| 12 | 25 | 25 | 500 μm or less | 50 | 0 |
| 13 | 15 | 10 | 500 μm or less | 75 | 0 |
| 14 | 20 | 20 | 500 μm or less | 50 | 10 |
| 14a | 20 | 20 | 3 to 6 mm | 50 | 10 |
| 15 | 25 | 25 | 500 μm or less | 30 | 20 |
| 16 | 20 | 15 | 500 μm or less | 30 | 35 |
| 17 | 25 | 25 | 500 μm or less | 50 | 0 |

TABLE 2

| Sample No. | Evaluation | Overall evaluation |
|---|---|---|
| 1 | Rigidity is insufficient and breakage strength of a molded article decreases because of a small amount of polylactic acid. | C |
| 2 | Satisfactory moldability | A |
| 3 | Satisfactory moldability | A |
| 4 | Extensibility upon molding is inferior because of too large amount polylactic acid. Cracking occurred upon removal after molding. | C |
| 5 | Extensibility upon molding is inferior because of too large amount polylactic acid. Cracking occurred upon removal after molding. | C |
| 6 | Extensibility is inferior. Cracking occurred upon removal after molding. | C |
| 7 | Satisfactory moldability | A |
| 8 | Satisfactory moldability | A |
| 9 | Satisfactory moldability | A |
| 9a | A pelletized raw material has a rough surface and lumps sometimes occur, or cracking sometimes occurs upon removal after injection molding. Yield tends to decrease. | B |
| 10 | Satisfactory moldability | A |
| 10a | A pelletized raw material has a rough surface and lumps sometimes occur, or cracking sometimes occurs upon removal after injection molding. Yield tends to decrease. | B |
| 11 | Satisfactory moldability | A |
| 12 | Satisfactory moldability | A |
| 13 | Moldability is inferior and breakage occurred upon removal from a mold. | C |
| 14 | Satisfactory moldability | A |
| 14a | Fluidity deteriorates and yield tends to decrease. | B |
| 15 | Satisfactory moldability | A |
| 16 | Fluidity deteriorates and moldability is sometimes inferior, and yield tends to decrease | B |
| 17 | Satisfactory moldability | A |

Examples 1, 4 to 6 and 13 in Tables 1 and 2 are Comparative Examples, and moldability was insufficient (C). In contrast, examples 2 to 3, 7 to 9, 10, 11 to 12, 14, 15 and 17 showed satisfactory moldability (A), and Examples 9a, 10a, 14a and 16 showed insufficient moldability and yield tends to decrease (B).

The invention claimed is:

1. A biodegradable resin composition containing:
   (A) a resin component comprising polylactic acid and polybutylene terephthalate, and
   (B) a powdered vegetable fiber component comprising corn starch, wherein
   the resin component (A) comprises 20 to 50 parts by weight of polylactic acid and 10 to 40 parts by weight of polybutylene terephthalate, and
   the powdered vegetable fiber component (B) comprises 10 to 70 parts by weight of corn starch,
   the total of the resin component (A) and the powdered vegetable fiber component (B) being considered as 100 parts by weight.

2. The biodegradable resin composition according to claim 1, the powdered vegetable fiber component (B) further comprises 10 to 30 parts by weight of a vegetable residue, and the total amount of the corn starch and the vegetable residue is from 10 to 70 parts by weight.

3. The biodegradable resin composition according to claim 1, the biodegradable resin composition being used for producing a molded article.

4. A method for producing the biodegradable resin composition according to claim 1, which comprises:
   (i) a step of crushing a resin component (A) comprising 20 to 50 parts by weight of polylactic acid and 10 to 40 parts by weight of polybutylene terephthalate, and
   (ii) a step of kneading a powdered vegetable fiber component (B) comprising 10 to 70 parts by weight of corn starch with the resin component obtained in the crushing step,
   the total of the resin component (A) and the powdered vegetable fiber component (B) being considered as 100 parts by weight.

5. The method according to claim 4, wherein the resin component (A) is crushed into particles having a particle diameter of 500 μm or less in the crushing step (i).

6. The method according to claim 4, further comprising (iii) a step of producing a molding material from the kneaded component obtained in the kneading step (ii).

7. A molded article produced from the biodegradable resin composition according to claim 1.

8. The biodegradable resin composition according to claim 1, wherein the powdered vegetable fiber component (B) comprises 30 to 70 parts by weight of corn starch.

9. The biodegradable resin composition according to claim 1, wherein the biodegradable resin composition comprises no blowing agent.

* * * * *